US011019531B2

(12) United States Patent
Nithiyanantham et al.

(10) Patent No.: US 11,019,531 B2
(45) Date of Patent: May 25, 2021

(54) OPTIMIZED USAGE REPORTING IN 4G/5G TELECOMMUNICATION NETWORKS

(71) Applicant: Cisco Technology, Inc., San Jose, CA (US)

(72) Inventors: Shivakumar Nithiyanantham, Bangalore (IN); Mukesh Yadav, Bangalore (IN); Sandeep Dasgupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 3 days.

(21) Appl. No.: 16/584,010

(22) Filed: Sep. 26, 2019

(65) Prior Publication Data

US 2021/0099909 A1    Apr. 1, 2021

(51) Int. Cl.
*H04W 28/06* (2009.01)
*H04W 4/24* (2018.01)
*H04W 80/10* (2009.01)
*H04M 15/00* (2006.01)

(52) U.S. Cl.
CPC .......... *H04W 28/06* (2013.01); *H04M 15/61* (2013.01); *H04W 4/24* (2013.01); *H04W 80/10* (2013.01)

(58) Field of Classification Search
CPC ...... H04M 3/22; H04M 3/2263; H04M 15/61; H04W 16/26; H04W 28/06; H04W 4/24
See application file for complete search history.

(56) References Cited

U.S. PATENT DOCUMENTS 7,693,268 B2 * 4/2010 Rossi ...................... H04M 3/22
379/112.06

OTHER PUBLICATIONS

ETSI, "5G; Telecommunication management; Charging management; 5G system, charging service; Stage 3 (3GPP TS 32.291 version 15.2.1 Release 15)", ETSI TS 132 291 V15.2.1, May 2019, 84 pages.
ETSI, "LTE; Interface between the Control plane Plane and the User Plane of EPC Nodes (3GPP TS 29.244 version 14.0.0 Release 14)", ETSI TS 129 244 V14.0.0, Jul. 2017, 147 pages.
Developing Solutions, Inc., "5G Testing With dsTest", https://www.developingsolutions.com/products/dstest-5g-core-network-testing/, downloaded Sep. 26, 2019, 5 pages.

* cited by examiner

*Primary Examiner* — Chandrahas B Patel
(74) *Attorney, Agent, or Firm* — Edell, Shapiro & Finnan, LLC

(57) ABSTRACT

At least one offline usage reporting rule is instantiated at a user plane element of the telecommunications network, wherein the usage reporting rule indicates at least one trigger condition. The user plane element detects an occurrence of the at least one trigger condition in traffic processed by the user plane element and, in response, generates and temporarily stores a first usage report. Subsequently, the user plane element detects an occurrence of an immediate reporting condition and, in response to detecting of the occurrence of the immediate reporting condition, sends the first usage report to a control plane element.

20 Claims, 7 Drawing Sheets

| OCTETS | BITS | | | | | | | |
|---|---|---|---|---|---|---|---|---|
| | 8 | 7 | 6 | 5 | 4 | 3 | 2 | 1 |
| 1 TO 2 | TYPE = 37 (DECIMAL) | | | | | | | |
| 3 TO 4 | LENGTH = n | | | | | | | |
| 5 | LIUSA | DROTH | STOPT | START | QUHTI | TIMTH | VOLTH | PERIO |
| 6 | SPARE | SPARE | EVEQU | EVETH | MACAR | ENVCL | TIMQU | VOLQU |
| 7 TO (n+4) | THESE OCTET(s) IS/ARE PRESENT ONLY IF EXPLICITLY SPECIFIED | | | | | | | |

FIG.2

| OCTETS | BITS | | | | | | | |
|---|---|---|---|---|---|---|---|---|
| | 8 | 7 | 6 | 5 | 4 | 3 | 2 | 1 |
| 1 TO 2 | TYPE = 37 (DECIMAL) | | | | | | | |
| 3 TO 4 | LENGTH = n | | | | | | | |
| 5 | LIUSA | DROTH | STOPT | START | QUHTI | TIMTH | VOLTH | PERIO |
| 6 | DCVOLTH | DCTIMTH | EVEQU | EVETH | MACAR | ENVCL | TIMQU | VOLQU |
| 7 TO (n+4) | THESE OCTET(s) IS/ARE PRESENT ONLY IF EXPLICITLY SPECIFIED | | | | | | | |

FIG.4 and CHF 118. AMF 106 may further interface

OPTIMIZED USAGE REPORTING IN 4G/5G TELECOMMUNICATION NETWORKS

TECHNICAL FIELD

The present disclosure relates to optimized usage reporting for charging in telecommunications networks.

BACKGROUND

In telecommunications network, such as the fifth generation (5G) Core (5GC) network, "charging" is the function whereby information related to a chargeable event is collected, formatted, transferred and evaluated in order to make it possible to determine usage for which the charged party may be billed (offline charging) or the subscriber's account balance may be debited (online charging). The "charged party" is the user involved in a chargeable event that has to pay (part or the whole) charges of the chargeable event, a third party paying the charges caused by one or all users involved in the chargeable event, or a network operator.

In the 5G network, the N4 Interface is the bridge between the control plane and the user plane. As such, the N4 Interface is the conduit for Protocol Data Unit (PDU) session management and traffic steering towards the User Plane Function (UPF), as well as for usage and event reporting towards the Session Management Function (SMF), including usage reporting the charging function (charging).

BRIEF DESCRIPTION OF THE DRAWINGS

FIG. 2 is a diagram illustrating a collection of Informational Elements (IEs) associated with a Usage Reporting Rule (URR) in accordance with 5G standards/specifications.

FIG. 4 is a diagram illustrating another collection of Informational Elements (IEs) associated with a Usage Reporting Rule (URR), in accordance with embodiments presented herein.

DESCRIPTION OF EXAMPLE EMBODIMENTS

Overview

Presented herein are techniques for optimized usage reporting for charging in telecommunications networks having separate control and data planes. At least one offline usage reporting rule is instantiated at a user plane element of the telecommunications network, wherein the usage reporting rule indicates at least one trigger condition. The user plane element detects an occurrence of the at least one trigger condition in traffic processed by the user plane element and, in response, generates and temporarily stores a first usage report. Subsequently, the user plane element detects an occurrence of an immediate reporting condition and, in response to detecting of the occurrence of the immediate reporting condition, sends the first usage report to a control plane element.

EXAMPLE EMBODIMENTS

Figure 1:
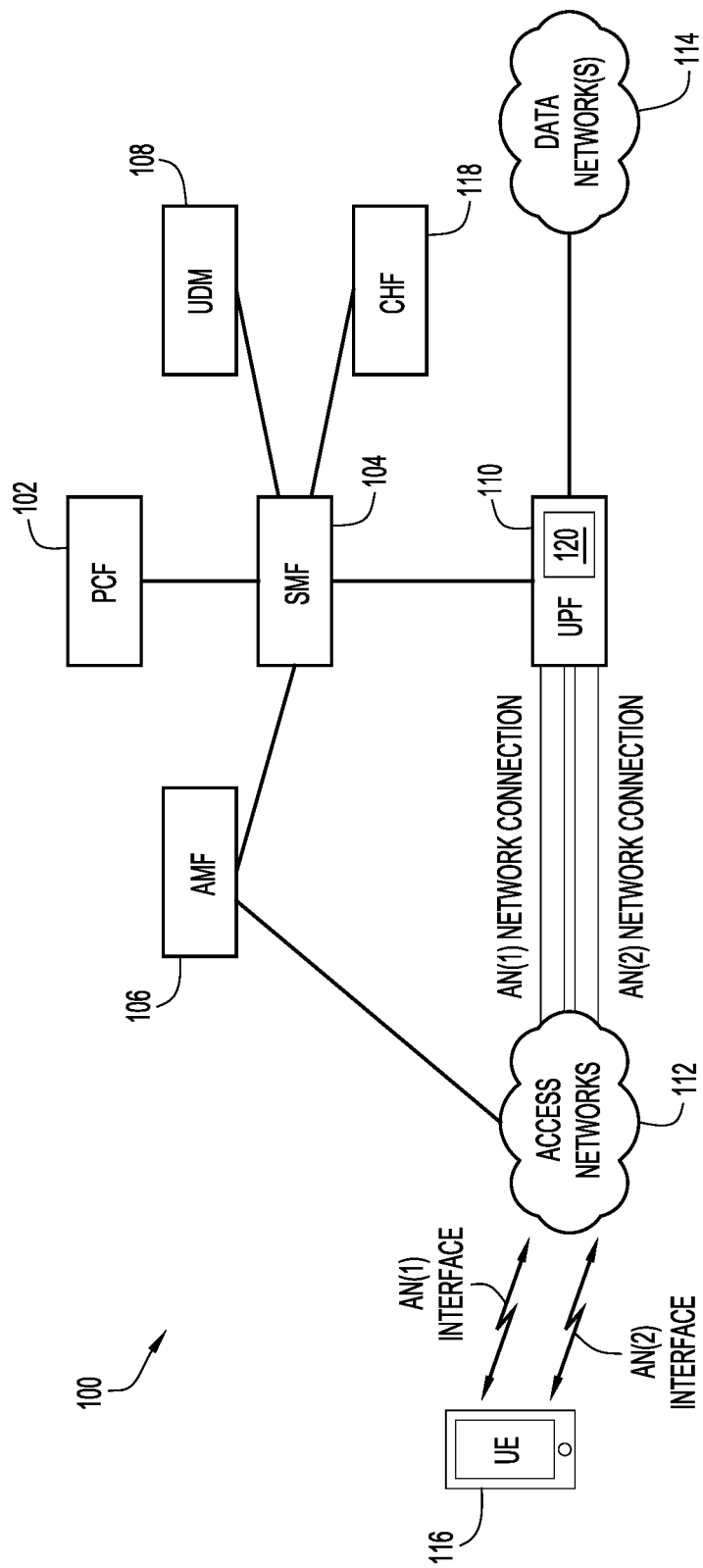
FIG. 1 is a diagram of a system in which techniques for optimized usage reporting for charging may be implemented, according to an example embodiment.

FIG. 1 is a block diagram of a system 100 in which techniques for optimized usage reporting for charging in telecommunications networks, sometimes referred to as optimized usage reporting, may be implemented, according to an example embodiment. In at least one implementation, the system 100 may include a Policy Control Function (PCF) 102, a Session Management Function (SMF) 104, an Access and Mobility Management Function (AMF) 106, a Unified Data Management (UDM) entity/function 108 (having a unified data repository or UDR), a User Plane Function (UPF) 110, at least two Access Networks (ANs) 112, and one or more data networks (DNs) 114. Further illustrated in system 100 is a user equipment (UE) 116 and a Charging Function (CHF) 118.

As illustrated in FIG. 1, PCF 102 may interface with SMF 104. SMF 104 may further interface with AMF 106, UDM 108, UPF 110, and CHF 118. AMF 106 may further interface with ANs 112 (e.g., with radios, etc. (not shown) configured for ANs 112). UPF 110 may further interface with ANs 112 via corresponding network connections (e.g., tunnels, etc.) and with one or more data network(s) 114. UE 116 may interface with ANs 112 via over-the-air Radio Frequency (RF) connections. For example, for the embodiment of FIG. 1, UE 116 may include configured hardware (e.g., receiver (s), transmitter(s), antenna(s), etc.), software and/or the like to facilitate first interface for accessing a first access network (AN(1) interface) and a second interface for accessing a second access network (AN(2) interface). Corresponding network connections for each AN 112, such as AN(1) network connections associated with the first access network and AN(2) network connections associated with the second access network, may be configured to interconnect ANs 112 and UPF 110. In at least one embodiment, PCF 102, SMF 104, AMF 106, UDM 108, UPF 110, and CHF 118 may be considered a mobile core network or, more generally, a mobile network such as a 5G Core Network (5GC).

Typically, AMF 106 provides access authentication services, authorization services, and mobility management control, while SMF 104 is responsible for session management with individual functions being supported on a per session basis and also for selection and control of a UPF (e.g., UPF 110) for data transfer. UPF 110 may operate as a Virtual Network Function (VNF) to provide packet routing and forwarding operations for user data traffic and may also perform a variety of functions such as packet inspection, traffic optimization, Quality of Service (QoS), billing, policy enforcement, billing operations, etc., for UE 116 PDU sessions.

UDM 108 generally stores subscription data for subscribers (e.g., UE 116) including, but not limited to, UE profiles and subscription-based ATSSS rules for UEs. PCF 102 typically stores policy data for system 100 including but not limited to, network operator policies, which may include operator-based ATSSS rules. During operation, for example, data from UDM 108 can be provided to PCF 102 to facilitate the application of policies to traffic flows as managed by SMF 104, which may provide UE Route Selection Policies (URSP) and ATSSS configurations/rules to UE 116 via AMF 106.

In various embodiments, UE 116 may be associated with any electronic device, machine, robot, etc. wishing to initiate a flow in system 100. The terms 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, an iPhone™, iPad™, a Google Droid™ phone, an IP phone, any other device and/or combination of devices, component, element, and/or object capable of initiating voice, audio, video, media, or data exchanges within system 100. Devices discussed herein may also be inclusive of a suitable interface to a human user such as a microphone, a display, a keyboard, or other terminal equipment. Devices discussed herein may also be any device that seeks to initiate a communication on behalf of another entity or element such as a program, a database, or any other component, device, element, or object capable of initiating an exchange within system 100. It is to be understood that any number of devices may be present in system 100.

In various embodiments, ANs 112 may be any combination of licensed spectrum access networks, such as 3GPP access networks (e.g., 4th Generation (4G)/Long Term Evolution (LTE), 5th Generation (5G), next Generation (nG), etc. access networks), unlicensed spectrum non-3GPP access networks (e.g., Institute of Electrical and Electronic Engineers (IEEE) 802.11 (Wi-Fi®), IEEE 802.16 (WiMAX®), Wireless Local Area Network (WLAN), etc. access networks), unlicensed spectrum 3GPP access networks (e.g., License Assisted Access (LAA), enhanced LAA (eLAA), etc. access networks), and/or the like. In various embodiments, data network(s) 114 may be any combination of the Internet, an Internet Protocol (IP) Multimedia Subsystem (IMS), enterprise network, and/or the like.

In a 5G network, charging is achieved in collaboration with network functions, such as PCF 102, SMF 104, UPF 110, and CHF 118. In particular, SMF 104 configures UPF 110 with Usage Reporting Rules (URRs) associated with Packet Detection Rules (PDRs). PDRs include/comprise contain information for matching data packets to certain processing rules. Both outer encapsulation and inner user-plane headers can be matched. URRs, in particular, include/comprise rules for counting and reporting traffic handled by UPF 110, generating reports to enable charging functionality in CHF 118.

As used herein, the term "usage reporting rules" refers to a collection of rules, policies, etc. implemented by a user plane element to monitor/inspect traffic for charging purposes. Merely, for ease of illustration, the techniques presented herein are described with reference to the Usage Reporting Rules (URRs) in the fifth generation (5G) Core (5GC) network. However, it is to be appreciated that reference to usage reporting rules and, in certain examples, Usage Reporting Rules (URRs) may refer to other deployments, such as 4G Control and User Plane Separation of Evolved Packet Core (EPC) nodes (CUPS) based deployments.

UPF 110 performs packet/traffic handling. When configured with an URR, UPF 110 operates to detect "trigger conditions" that are set by an URR. If a trigger condition is detected in the traffic handled by UPF 110, UPF 110 performs usage reporting to SMF 104 via Packet Forwarding Control Protocol (PFCP) messages. That is, upon detection of a trigger condition, UPF 110 generates and sends a "usage report" to SMF 104. SMF 104 then sends the information in the usage report, sometimes referred to herein as the "usage report data" or "usage data" to CHF 118 in a Charging Data Request (CDR) message. In other words, in 5G network, usage reports for traffic usage of/by a subscriber relating to the charging function of the network are sent by UPF 110 to SMF 104, which then relays the usage report data to CHF 118. The exchange between UPF 110 and SMF 104 is conventionally performed in two primary ways, namely: (1) asynchronous reporting, and (2) synchronous reporting.

In conventional synchronous reporting, the usage reporting is performed at UPF 110 and then relayed to SMF 104 (via PFCP messages). UPF 110 immediately sends the usage reports in response to detection of one or more predetermined/preconfigured trigger conditions/conditions, which as noted above are configured by SMF 104 via URRs. Upon receiving a usage report, SMF 104 checks the usage report trigger "type" (i.e., the type of predetermined trigger(s) that caused UPF 110 to send the usage report) and the usage report "category," where the category indicates the timing for forwarding of the usage report. For example, if the category is "IMMEDIATE_REPORT," then SMF 104 immediately sends the usage report to CHF 118. If the category is "DEFERRED_REPORT," then SMF 104 buffers the usage report received from UPF 110 for a period of time before being sent along with the next usage report categorized as "IMMEDIATE_REPORT," or when the number of buffered usage reports crosses a configured threshold.

With conventional synchronous reporting, some events such as "AMBR_CHANGE," "PLMN_CHANGE," etc. are provisioned by CHF 118 and are detected at SMF 104. In this case, SMF 104 queries usage reports from all URRs associated with the event in a PFCP Modification Request message to UPF 110. In response, SMF 104 receives usage reports for (associated with) each queried URR.

In general, the trigger condition category, described above, reduces the signaling between SMF 104 and CHF 118 by sending deferred usage reports in one single message (i.e., reduced signaling between SMF 104 and CHF 118 for usage reporting). The "DEFERRED_REPORT" category is used, for example, in situations in which CHF 118 does not require immediate reporting because there are no actions required upon receipt of the associated usage reports (e.g., perhaps only billing). Therefore, even if usage reports are received later, CHF 118 can still enable the associated action (e.g., billing). However, in situations in which some action must be taken based on a received usage report (triggered based on a specified even), CHF 118 configures SMF 104 to immediately report the associated usage reports.

However, a similar optimization is not defined in current 3rd Generation Partnership Project (3GPP) specifications for the N4 interface between SMF 104 and UPF 110. Instead, in conventional arrangements, UPF 110 continues to send usage reports to SMF 104 as soon as it detects any of the preconfigured reporting triggers for an associated URR (i.e., immediate reporting). That is, as noted above, in conventional arrangements the buffering of usage reports and the subsequent signaling optimization only occurs between SMF 104 and CHF 118.

A similar problem exists in the 4G Control and User Plane Separation of Evolved Packet Core (EPC) nodes (CUPS) based deployment, where the Packet Data Network (PDN) Gateway User plane function (PGW-U) sends usage reports to the PDN Gateway Control plane (PGW-C) function. In general, the PGW-U serves as the user data plane ingress and egress point to the EPC when control and user plane separation is in place, while the PGW-C controls the functionality performed by the assigned PGW-U when control and user plane separation is in place. In usage reporting, the PGW-U sends usage reports on the SXb interface to the PGW-C at the same moment when a preconfigured reporting trigger is detected and the PGW-U has provisions to generate and store Charging Data Records (CDRs).

Accordingly, presented herein are techniques to provide usage report signaling optimizations at the 5G N4 interface between UPF 110 and SMF 104 so as to optimize (e.g., reduce) signaling between UPF 110 and SMF 104. The techniques presented herein may also be applied to the SXb interface in a CUPS based 4G deployment to optimize (e.g., reduce) signaling between PGW-U and PGW-C.

Merely for ease of description, the techniques presented herein will be primarily described with reference to optimized usage reporting for charging, sometimes referred to herein as usage report signaling optimizations, at the 5G N4 interface. However, as noted above, the techniques presented herein may also be applied to CUPS based 4G deployments. Table 1, below, illustrates a mapping for use in applying the 5G N4 interface examples to a CUPS based 4G deployment, as well as general terminology applicable to both 4G and 5G deployments, as well as any future technologies hereinafter developed.

described with reference to the usage report signaling optimizations to a 5G N4 interface.

Returning to the example of FIG. 1, in a 5G network, SMF 104 configures (arms) UPF 110 for charge usage reporting via Usage Reporting Rules (URRs) (i.e., by creating URRs at UPF 110). In certain examples, this is performed in one of two messages, namely: (1) the PFCP Session Establishment Exchange, and (2) the PFCP Session Modify Exchange. As noted above, a URR includes (defines) trigger conditions (charge reporting conditions) indicating when UPF 110 has to generate a usage report, as well as values thresholds) corresponding to those triggers. That is, when UPF 110 detects traffic satisfying a trigger condition (meeting the value of the trigger) defined by a URR, UPF 110 generates a usage report. As described further below, the techniques presented herein are used to set whether the UPF 110 sends the generated usage report to SMF 104 immediately, or whether UPF 110 buffers the usage report.

There are a number of different trigger conditions for which UPF 110 may be configured to send usage reports to SMF 104. These trigger conditions include, for examples, (1) Time Limit (Time Limit Threshold), (2) Volume Limit (Volume Limit Threshold), (3) Time Quota Exhausted, (4) Volume Quota Exhausted, (5) Quota Holding time, and (6) Immediate Reporting, among others. A significantly large

TABLE 1

| General Terminology | 5G Deployment Specific Terminology | 4G Deployment Specific Terminology | Description of Terminology |
|---|---|---|---|
| User Plane Element | User Plane Function (UPF) | Packet Data Network (PDN) Gateway User plane function (PGW-U) | Separated entity performing user plane functions |
| Control Plane Element | Session Management Function (SMF) | PDN Gateway Control plane function, referred to (PGW-C) | Separated entity performing control plane functions |
| Charging Element | Charging Function (CHF) | Online Charging System (OCS) | System allowing a communications service provider to charge their customers |
| User-Control Plane Interface | N4 | SXb | Interface between Control Plane Function and User Plane Function |
| Control Plane-Charging Interface | N40 | GY or GZ | Interface between Control Plane and Charging Server |
| User-Control Plane Messages | Packet Forwarding Control Protocol (PFCP) messages | Packet Forwarding Control Protocol (PFCP) messages | Messages between Control Plane Function and User Plane Function |
| Control Plane-Charging Messages | Charging Data Request (CDR) messages | GY Interface: Credit-Control-Request (CCR)/Credit-Control-Answer (CCA) messages GZ Interface: Charging Data Record (CDR) messages | Messages between Control Plane and Charging Server |

In Table 1, above, the first column illustrates general terminology used herein to refer to both 4G and 5G deployments. The second column of Table 1 illustrates terminology that may be specific to 5G deployments, while the third column of Table 1 illustrates terminology that may be specific to 4G deployments. The fourth column of Table 1 provides a general description of the associated 4G, 5G, and general terminology. As noted, merely for ease of description, the techniques presented herein will be primarily percentage of the usage reporting triggers detected at UPF 110 (e.g., 90% or more) will be either the Volume Limit or the Time Limit triggers (i.e., reaching either the Time Limit threshold or the Volume Limit threshold), either "With Quota" and/or "Without Quota."

In telecommunications networks, charging may be categorized as "online charging" or "offline charging." Online charging refers to the charging mechanism where charging information can affect, in real-time, the service rendered and therefore a direct interaction of the charging mechanism with bearer/session/service control is required. Offline charging refers to the charging mechanism where charging information does not affect, in real-time, the service rendered. In the above triggers, "With Quota" is an online scenario where, when the threshold is hit, it has to be reported immediately to get a new Quota (e.g., UPF 110 can only process the given quota of traffic and must receive a new quota before processing any further traffic). "Without Quota" is an offline scenario where immediate reporting is not required as the charging information does not affect, in real-time, the service rendered. Therefore, in accordance with embodiments presented herein, UPF 110 can buffer/store usage reports "Without Quota" until a maximum number of stored usage reports ("max allowed reports") is reached and/or when there a usage report has to be immediately relayed. This implementation alone will save signaling (e.g., 50% by heuristics). The SMF 104 can still implement the above described buffering operations for sending usage data to CHF 118.

In accordance with the techniques presented herein, a configuration, referred to as "optimized usage reporting," is added to UPF 110 (in 5G deployments) and/or PGW-U (in CUPS based 4G deployments) to enable signaling optimizations for offline volume and time threshold triggers. In the example of FIG. 1, the optimized usage reporting configuration of UPF 110 is represented by box 120. Furthermore, in accordance with the techniques presented herein, the N4 interface (between UPF 110 and SMF 104 in 5G) or the Sxb interface (between the PGW-U and the PGW-C in 4G) is modified in order to override the above configured behavior for situations in which volume and time threshold triggers should be immediately reported to CHF 118 (or OCS in 4G).

The optimized usage reporting configuration 120 is enabled at the UPF 110 via, for example, a firmware update. The firmware update causes the UPF 110 to handle usage reporting functions, in accordance with URRs, differently than in the conventional configurations. In particular, with the optimized usage reporting configuration 120, when this configuration is present, UPF 110 will, by default, automatically buffer "offline" usage reports, namely usage reports for the Time Limit and Volume Limit triggers that are Without Quota. For all other "online" trigger conditions, such as Time Quota Exhausted, Volume Quota Exhausted, etc., UPF 110 will not buffer the usage reports and instead send it immediately to SMF/PGW-C. In other words, the optimized usage reporting configuration 120 causes the UPF 110 to, when a URR is Without Quote and sets the Time Limit and/or Volume Limit triggers, automatically (by default) generate and temporarily store usage reports for the URR (i.e., the UPF 110 is configured to interpret the setting of the Time Limit and/or Volume Limit triggers Without Quote as a default instruction to generate and temporarily store usage reports for that URR).

The optimized usage reporting configuration 120 is summarized below in Table 2. More particularly, column 1 of Table 2 indicates the trigger condition "type," while column 1 of Table 2 indicates the trigger condition "category," where the "category" indicates the timing of the associated usage report (i.e., either immediate or deferred/buffered).

TABLE 2

| Trigger Type | Trigger Category |
| --- | --- |
| Time Limit | DEFERRED_REPORT |
| | (If offline, meaning Without Quota) |
| Volume Limit | DEFERRED_REPORT |

TABLE 2-continued

| Trigger Type | Trigger Category |
| --- | --- |
| | (If offline, meaning Without Quota) |
| Time Quota Exhausted | IMMEDIATE_REPORT |
| Volume Quota Exhausted | IMMEDIATE_REPORT |
| Quota Holding time | IMMEDIATE_REPORT |

In Table 2, "DEFERRED_REPORT" means that UPF 110 is configured to generate and temporarily store (e.g., buffer) a usage report for the URR when the corresponding trigger is detected. UPF 110 will continue to store the usage report, and any other "offline" (DEFERRED_REPORT) usage reports until an "immediate reporting condition" is detected. As used herein, an immediate reporting condition is an event occurring at UPF 110 which causes UPF 110 to send all stored, and previously unsent, usage reports to SMF 104. Immediate reporting conditions may include, for example, the detection of an "online" (IMMEDIATE_REPORT) trigger condition, determination that the number of stored usage reports has reached a configured threshold, determining that a predetermined period of time has passed, etc.

For example, UPF 110 may store a usage report for a first DEFERRED_REPORT URR until a usage report for an IMMEDIATE_REPORT URR is detected (i.e., immediate reporting condition is detection of a trigger condition for an online URR). At that time, UPF 110 sends the usage report for the IMMEDIATE_REPORT URR, the usage report for a first DEFERRED_REPORT URR, and any other stored and non-previously sent usage reports, to SMF 104. Alternatively, UPF 110 may store a plurality of DEFERRED_REPORT URRs. Once the number of stored usage reports reaches a threshold, UPF 110 sends all of the stored, and not previously sent, usage reports to SMF 110 (i.e., immediate reporting condition is determination that the number of stored usage reports has reached a configured threshold). Once a usage report is sent to SMF 110, the usage report may be cleared/deleted from memory of UPF 110.

In operation, SMF 104 provisions UPF 110 with URRs at two different times, namely during the PFCP Establishment Request and during the PFCP Modification Request. The URRs are associated with various Information Elements (IEs) to indicate the trigger conditions values (e.g., Volume Limit, Time Lime, Time Quota, etc.) and have the reporting trigger IE (which configures UPF 110 with the various reporting triggers), which can be extended to control the Time Limit and Volume Limit triggers.

FIG. 2 illustrates an example IE 124 associated with a URR, in accordance with embodiments presented herein. With the optimized usage reporting configuration 120 (FIG. 1) enabled, the IE 124 causes UPF 110 to defer usage reporting (i.e., temporarily buffer/store usage reports) associated with the Time Limit (TIMTH) and Volume Limit (TIMTH)

Figure 3:
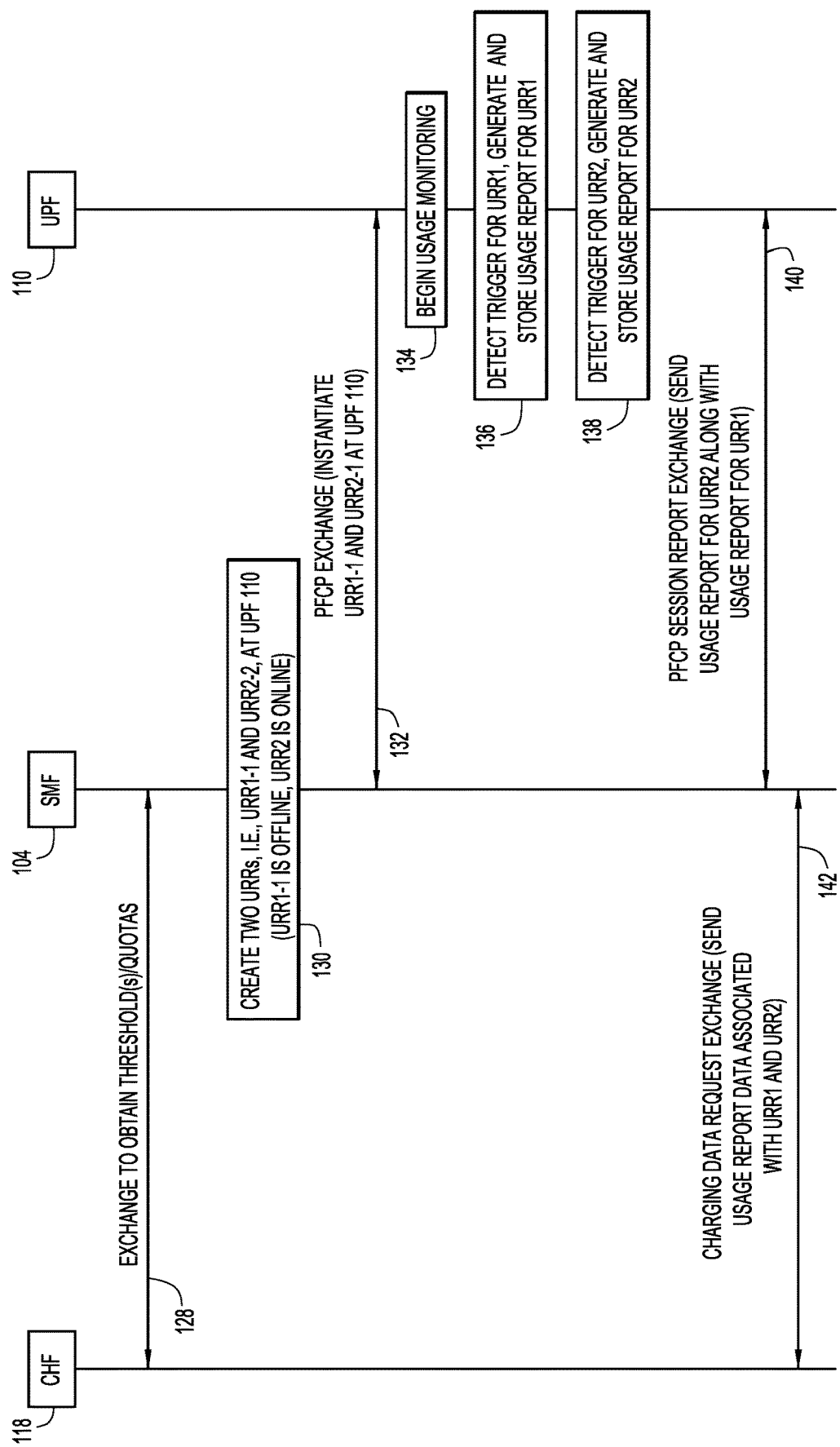
FIG. 3 is a flow diagram illustrating techniques for optimized usage reporting, in accordance with certain embodiments presented herein.

FIG. 3 is a flow diagram illustrating one example use case of the techniques presented herein, namely where the optimized usage reporting configuration is enabled at a UPF. For ease of description, the flow diagram of FIG. 3 will be described with reference to the arrangement of FIG. 1, including SMF 104, UPF 110, and CHF 118.

The flow of FIG. 3 begins at 128 where SMF 104 and CHF 118 perform a CDR exchange to obtain charge reporting information (e.g., trigger condition values/thresholds, Quotas, etc.). At 130, SMF 104 uses the charge reporting information obtained from CHF 118 to create first and second URRs for instantiation and implementation at UPF 110. In this example, the first URR is referred to as "URR1," and is an offline URR (i.e., Time Limit (TIMTH) and/or Volume Limit (TIMTH) are set Without Quota). The second URR is referred to as "URR2," and is an online URR (i.e., some trigger condition is set With Quota). As shown by arrow 132, URR1 and URR2 are instantiated (e.g., installed) at UPF 110 via a PFCP exchange.

As noted above, UPF 110 processes traffic (packets) in the network. At 134, while UPF 110 processes the traffic, UPF 110 also monitors the traffic for any of the trigger conditions set by URR1 and/or URR2. At 136, UPF 110 detects a trigger condition set by URR1 (i.e., detects Time Limit (TIMTH) and/or Volume Limit (TIMTH)). UPF 110 generates a first usage report for URR1, where the first usage report indicates the detected trigger and associated data, as appropriate. However, since URR1 is offline (trigger(s) is/are set Without Quota), the first usage report is not immediately sent to SMF 104. Instead, the first usage report is temporarily stored (e.g., buffered) in memory of UPF 110 until an immediate reporting condition, as detailed above, is detected.

At 138, UPF 110 detects a trigger condition set by URR2 (i.e., some trigger condition With Quota). UPF 110 generates a second usage report for URR2, where the second usage report indicates the detected trigger and associated data, as appropriate. Since URR2 is online, the second usage report should be sent to SMF 104 immediately. Additionally, as noted above, the detection of the trigger condition set by URR2 is an immediate reporting condition (i.e., immediate reporting condition is detection of a trigger condition for an online URR). Therefore, as shown at 140, UPF 110 sends the second usage report (for URR2) and the first usage report (for URR1) to SMF 104 via a PFCP exchange. As shown at 142, SMF 104 is configured to send usage report data associated with the first and second usage reports to CHF 118 via a CDR exchange.

As noted, when the optimized usage reporting configuration is enabled at UPF 110, UPF 110 operates, by default, as shown in FIG. 3. That is, UPF 110 is configured to automatically defer reporting of usage reports for offline URRs. However, in accordance with certain embodiments presented herein, there may be a need to override this default operation such that usage reports for offline URRs are not deferred, but instead reported immediately to SMF 104 and, accordingly, immediate to CHF 118. This override of the optimized usage reporting configuration, sometimes referred to herein as disabling of the optimized usage reporting configuration, occurs through modified IEs.

As noted above, URRs are associated with various Information Elements (IEs) to indicate the trigger conditions values (e.g., Volume Limit, Time Lime, Time Quota, etc.) and have reporting trigger IE (which configures UPF 110 with the various reporting triggers), which can be extended to control the Time Limit and Volume Limit triggers. As shown in FIG. 2, the example IE 124 has bits (e.g., in octet 5) for the trigger conditions, but has are two spare (unused) bits, namely bits 7 and 8 in octet 6. If deferred reporting is desired (i.e., optimized usage reporting configuration operates to temporarily store and later send usage reports for offline URRs), these two spare bits are blank. In accordance with embodiments presented herein, these two spare bits can be used to override the default deferred reporting configuration.

More specially, if SMF 104 learns that the default deferred reporting configuration is not desired (e.g., for a specific user), then SMF 104 will instantiate a URR with IEs where the spare bits 7 and 8 in octet 6 indicate to UPF 110 that deferred reporting is not desired and that, instead, UPF 110 should immediately report both online and offline usage reports. That is, if UPF 110 receives a URR in which bit 7 in octet 6 is set with a value, referred to as the deferred control time threshold (DFTIMTH), then UPF 110 will immediately report any usage reports related to the Time Limit triggers, regardless of whether the URR is online or offline (i.e., for both With Quota and Without Quota). In certain examples, if the URR is online, SMF 104 will not send bits 6 and/or 7. Even if SMF 104 sends bits 6 or 7, UPF 110 will ignore them when the URR is online. If UPF 110 receives an offline URR in which bit 8 in octet 6 is set with a value, referred to as the deferred control volume threshold (DFVOLTH), then UPF 110 will immediately report any usage reports related to the Volume Limit triggers, regardless of whether the URR is online or offline (i.e., for both With Quota and Without Quota). In the case of an offline URR, UPF 1100 will take action on bits 6 and 7 only in cases in which the trigger is Time Limit and/r Volume Limit.

FIG. 4 illustrates an example IE 144 associated with a URR, in accordance with embodiments presented herein. IE 144 causes UPF 110 to override the optimized usage reporting configuration and immediate send usage reports associated with the Time Limit (TIMTH) and Volume Limit (TIMTH) to SMF 104. In other words, in this example, CHF 118 provides a category for Volume/Time thresholds for offline scenarios that are different from the default (i.e., the deferred reporting). In cases in which the trigger category for Volume/Time thresholds is different from the default, SMF 104 relays this information to UPF 110 in a corresponding URR with one or both of the spare bits set. As such, UPF 110 can override the default configuration.

Figure 5:
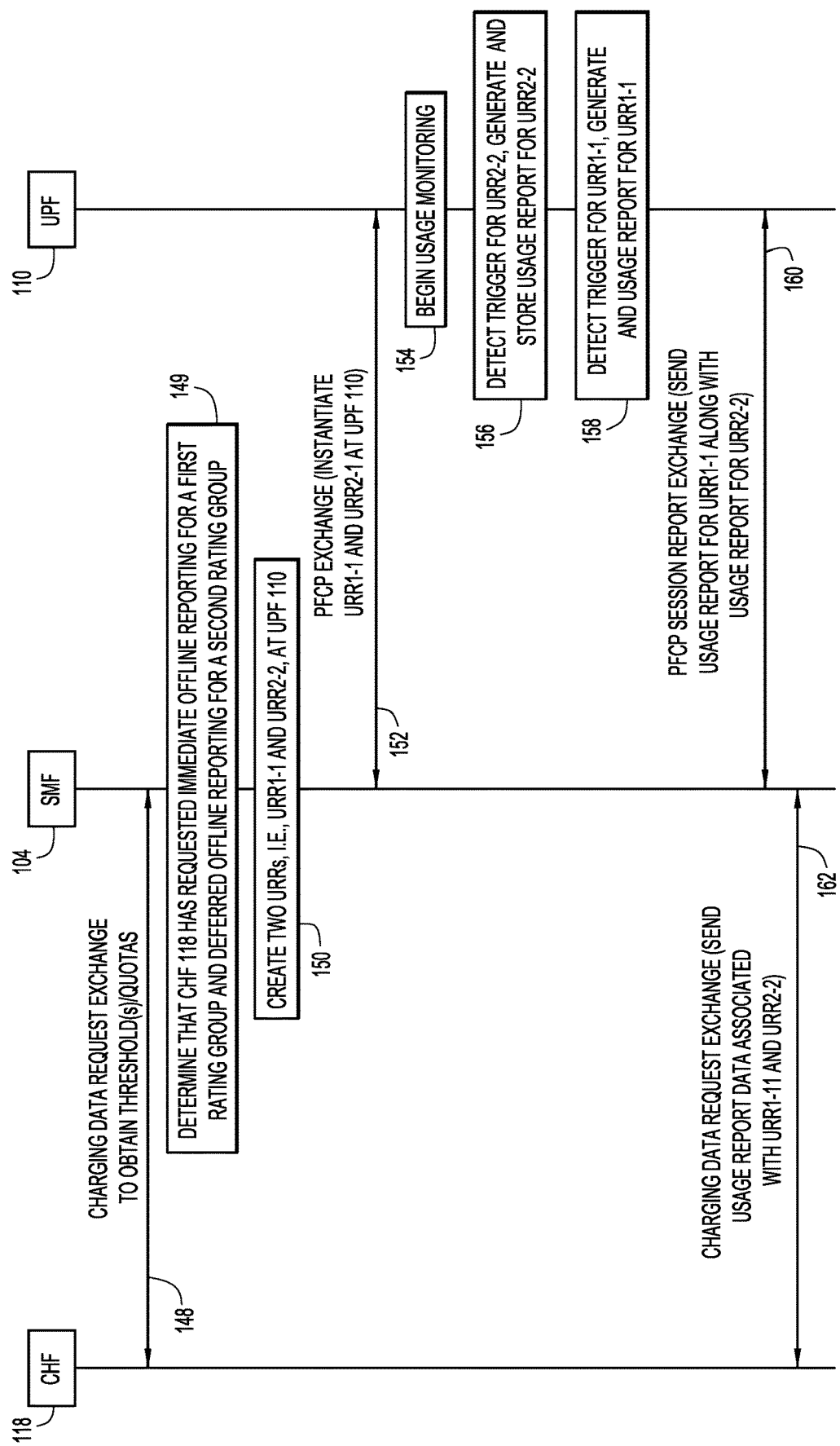
FIG. 5 is another flow diagram illustrating techniques for optimized usage reporting, in accordance with certain embodiments presented herein.

FIG. 5 is a flow diagram illustrating another example use case of the techniques presented herein, namely where the optimized usage reporting configuration is enabled at a UPF, but is overridden by an SMF. For ease of description, the flow diagram of FIG. 5 will be described with reference to the arrangement of FIG. 1, including SMF 104, UPF 110, and CHF 118.

The flow of FIG. 5 begins at 148 where SMF 104 and CHF 118 perform a CDR exchange to obtain charge reporting information (e.g., trigger condition values/thresholds, Quotas, etc.). At 149, SMF 104 determines that the charge reporting information relates to a first reporting group and a second reporting group. SMF 104 also determines that CHF 118 has requested immediate offline reporting for the first rating group, but deferred offline reporting for the second rating group. In other words, for URRs associated with the second rating group, UPF 110 should defer reporting in accordance with default operation of the optimized usage reporting configuration (i.e., operates to temporarily store and later send usage reports for offline URRs associated with the second rating group). However, for URRs associated with the first rating group, UPF 110 should immediate report both online and offline usage reports (i.e., override the default operation of the optimized usage reporting configuration for offline URRs associated with the first rating group).

Based on the above charge reporting information and associated determinations, SMF 104 creates first and second URRs for instantiation and implementation at UPF 110. In this example, the first URR is referred to as "URR1-1," and is an offline URR (i.e., Time Limit (TIMTH) and/or Volume Limit (TIMTH) are set Without Quota), but the deferred control time threshold (DFTIMTH) and/or the deferred control volume threshold (DFVOLTH) is set. With DFTIMTH and/or DFVOLTH set. The second URR is referred to as "URR2-2," and is also an offline URR (i.e., Time Limit (TIMTH) and/or Volume Limit (TIMTH) are set Without Quota). As shown by arrow 132, URR1-1 and URR2-1 are instantiated (e.g., installed) at UPF 110 via a PFCP exchange.

As noted above, UPF 110 processes traffic (packets) in the network. At 154, while UPF 110 processes the traffic, UPF 110 also monitors the traffic for any of the trigger conditions set by URR1-1 and/or URR2-2. At 156, UPF 110 detects a trigger condition set by URR2-2 (i.e., detects Time Limit (TIMTH) and/or Volume Limit (TIMTH)). UPF 110 generates a first usage report for URR2-2, where the first usage report indicates the detected trigger and associated data, as appropriate. However, since URR2-2 is offline (trigger(s) is/are set Without Quota), the first usage report is not immediately sent to SMF 104. Instead, the first usage report is temporarily stored (e.g., buffered) in memory of UPF 110 until an immediate reporting condition, as detailed above, is detected.

At 158, UPF 110 detects a trigger condition set by URR1-1. UPF 110 generates a second usage report for URR1-1, where the second usage report indicates the detected trigger and associated data, as appropriate. As noted above, URR1-1 is an offline URR (i.e., Time Limit (TIMTH) and/or Volume Limit (TIMTH) are set Without Quota), but the DFTIMTH and/or the DFVOLTH is set to indicate immediate reporting. Due to the setting of DFTIMTH and/or the DFVOLTH (i.e., the URR indicates immediate reporting for offline), the second usage report should be sent to SMF 104 immediately. Additionally, the detection of the trigger condition set by URR1-1 is an immediate reporting condition (i.e., immediate reporting condition is detection of a trigger condition for an URR associated with immediate reporting). Therefore, as shown at 160, UPF 110 sends the second usage report (for URR1-1) and the first usage report (for URR2-2) to SMF 104 via a PFCP exchange. As shown at 162, SMF 104 is configured to send usage report data associated with the first and second usage reports to CHF 118 via a CDR exchange.

In summary, FIG. 5 illustrates an example in which CHF 118/SMF 104 can override the optimized usage reporting configuration (i.e., deferred reporting) via the setting of spare bits (DCTIMTH/DCVOLTH) in the URR IEs.

Figure 6:
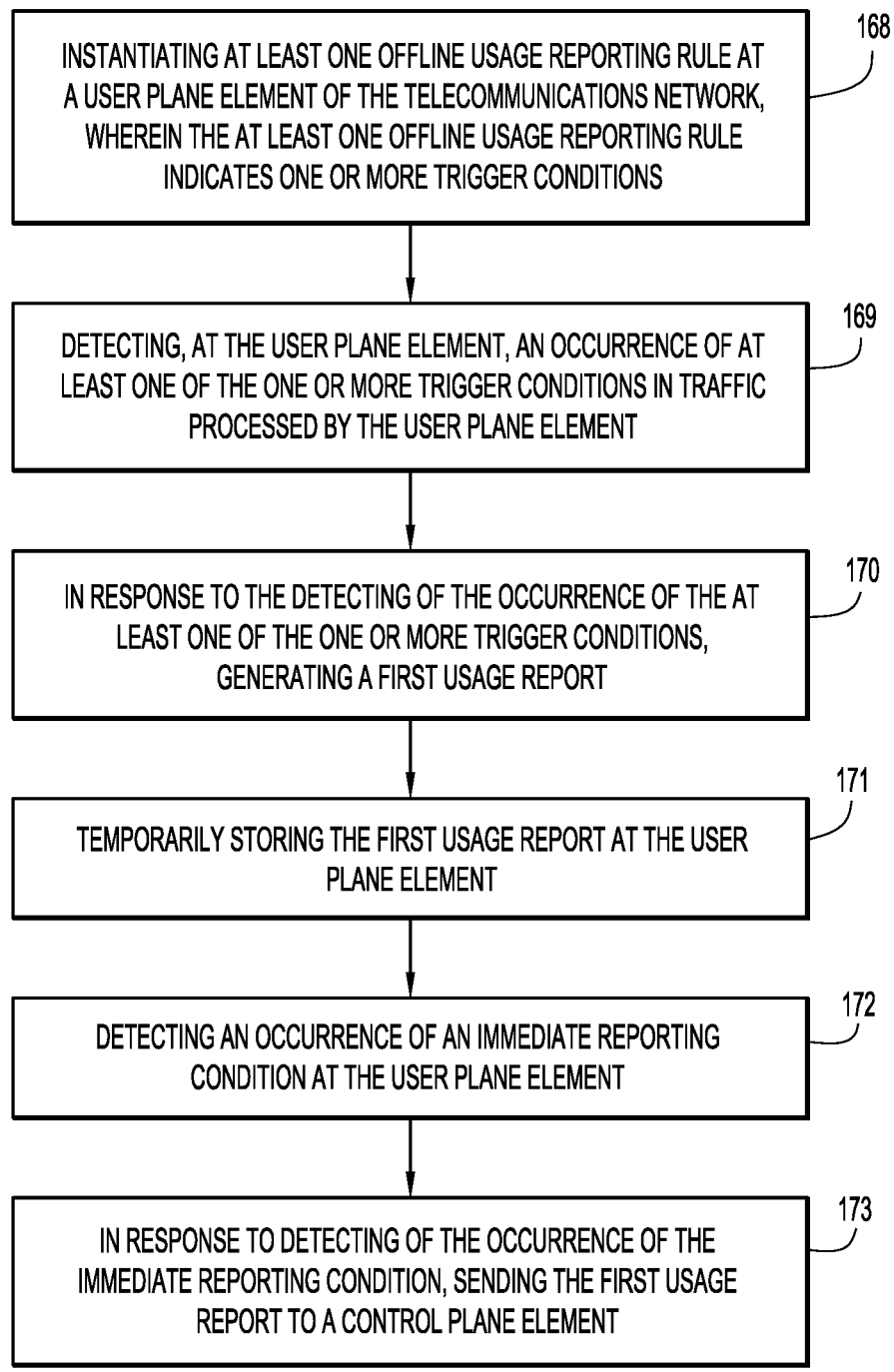
FIG. 6 is a flowchart of a method, in accordance with certain embodiments presented herein.

FIG. 6 is a flowchart of a method 166 for charge usage reporting in a telecommunications network operating with separate control and data planes, in accordance with embodiments presented herein. Method 166 begins at 168 where a user plane element of the telecommunications network instantiates at least one offline usage reporting rule at the user plane element. The at least one offline usage reporting rule indicates one or more trigger conditions. At 169, the user plane element detects an occurrence of at least one of the one or more the trigger conditions in traffic processed by the user plane element. At 170, in response to the detecting of the occurrence of the at least one of the one or more trigger conditions, the user plane element generates a first usage report. At 171, the user plane element temporarily stores the first usage report at the user plane element. At 172, the user plane element detects an occurrence of an immediate reporting condition at the user plane element. At 173, in response to detecting of the occurrence of the immediate reporting condition, the user plane element sends the first usage report to a control plane element.

Figure 7:
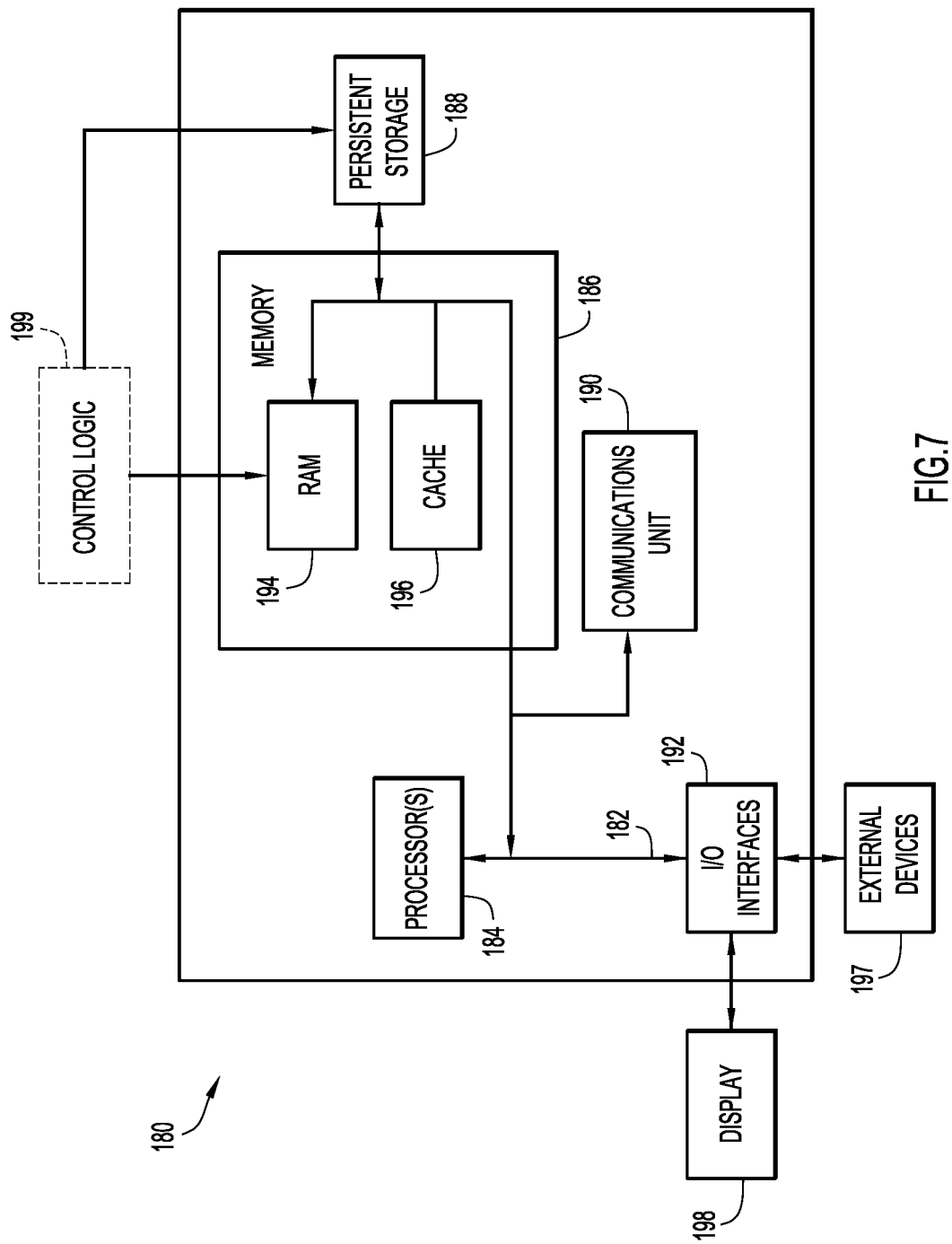
FIG. 7 is a hardware block diagram of a computing device that may perform functions for providing optimized usage reporting for charging, in connection with the techniques depicted in FIGS. 1-6.

Referring to FIG. 7, FIG. 7 illustrates a hardware block diagram of a computing device 780 that may perform the functions of a user plane element (e.g., UPF 110 or PGW-U), the functions of a control plane element (e.g., SMF 104 or PGW-C), and/or the functions of a charging element (e.g., CHF 118 or OCS), referred to herein in connection with FIGS. 1-6. It should be appreciated that FIG. 7 provides only an illustration of one embodiment and does not imply any limitations with regard to the environments in which different embodiments may be implemented. Many modifications to the depicted environment may be made.

As depicted, the device 180 includes a bus 182, which provides communications between computer processor(s) 184, memory 186, persistent storage 188, communications unit 190, and input/output (I/O) interface(s) 192. Bus 182 can be implemented with any architecture designed for passing data and/or control information between processors (such as microprocessors, communications and network processors, etc.), system memory, peripheral devices, and any other hardware components within a system. For example, bus 182 can be implemented with one or more buses.

Memory 186 and persistent storage 188 are computer readable storage media, which can be inclusive on non-transitory computer readable storage media. In the depicted embodiment, memory 186, which may be inclusive of one or more memory element(s), includes random access memory (RAM) 194 and cache memory 196. In general, memory 186 can include any suitable volatile or non-volatile computer readable storage media. Instructions for control logic 199 may be stored in memory 186 and/or persistent storage 188 for execution by processor(s) 184. When the processor(s) 184 execute control logic 199, the processor(s) 184 are caused to perform the operations described above in connection with FIGS. 1-6. That is, the control logic 199 may be configured to executed to perform the functions of a user plane element (e.g., UPF 110 or PGW-U), the functions of a control plane element (e.g., SMF 104 or PGW-C), and/or the functions of a charging element (e.g., CHF 118 or OCS), referred to herein in connection with FIGS. 1-6.

One or more programs and/or other logic may be stored in persistent storage 188 for execution by one or more of the respective computer processors 184 via one or more memory element(s) of memory 186. The persistent storage 188 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 188 may also be removable. For example, a removable hard drive may be used for persistent storage 188. Other examples include optical and magnetic disks, thumb drives, and smart cards that are inserted into a drive for transfer onto another computer readable storage medium that is also part of persistent storage 188.

Communications unit 190, in these examples, provides for communications with other data processing systems or devices. In these examples, communications unit 190 includes one or more network interface cards. Communications unit 190 may provide communications through the use of either or both physical and wireless communications links.

I/O interface(s) 192, which may be inclusive of one or more network interface cards (NICs), allows for input and output of data with other devices that may be connected to computing device 180. For example, I/O interface 192 may provide a connection to external devices 197 such as a keyboard, keypad, a touch screen, and/or some other suitable input device. External devices 197 can also include portable computer readable storage media such as database systems, thumb drives, portable optical or magnetic disks, and memory cards.

Software and data used to practice embodiments can be stored on such portable computer readable storage media and can be loaded onto persistent storage 188 via I/O interface(s) 192. I/O interface(s) 192 may also connect to a display 198. Display 198 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

In summary, presented herein are techniques that reduce the usage report signaling between SMF and UPF on the same scale as with the usage report signaling between SMF and CHF in 5G deployments. The techniques presented herein can also be extended to 4G CUPS to reduce usage report signaling between PGW-U and PGW-C. Statistically usage reports for volume and time thresholds account for 90% of the total signaling initiated by UPF 110 per session. The techniques presented herein significantly reduce such signaling for the offline charging cases.

The techniques presented herein also provide the flexibility to override the optimization in case CHF requests exclusively to send immediate reporting for volume/time threshold triggers for offline charging. The additional signaling introduced by CUPS based 5G (and 4G CUPS) solutions due to usage reporting is controlled by the techniques presented herein and the overall signaling in the network looks similar to the non-CUPS deployments.

In one aspect, a method for charge usage reporting in a telecommunications network operating with separate control and data planes. The method comprises: instantiating at least one offline usage reporting rule at a user plane element of the telecommunications network, wherein the at least one offline usage reporting rule indicates one or more trigger conditions; detecting, at the user plane element, an occurrence of at least one of the one or more trigger conditions in traffic processed by the user plane element; in response to the detecting of the occurrence of the at least one of the one or more trigger conditions, generating a first usage report; temporarily storing the first usage report at the user plane element; detecting an occurrence of an immediate reporting condition at the user plane element; and in response to detecting of the occurrence of the immediate reporting condition, sending the first usage report to a control plane element.

In certain aspects, instantiating the at least one offline usage reporting rule at the user plane element comprises: instantiating at least one offline usage reporting rule in which the at least one of the one or more trigger conditions is a time limit. In certain aspects, instantiating the at least one offline usage reporting rule at the user plane element comprises: instantiating at least one offline usage reporting rule in which the at least one of the one or more trigger conditions is a volume limit.

In certain aspects, the method further comprises: instantiating at least one online usage reporting rule at the user plane element, wherein the at least one online usage reporting rule indicates at least a second trigger condition, and wherein detecting the occurrence of an immediate reporting condition at the user plane element comprises: detecting an occurrence of the at least second trigger condition in traffic processed by the user plane element. In certain examples, in response to the detecting of the occurrence of the at least second trigger condition, the method further comprises: generating a second usage report; and sending at least the second usage report and the first usage report to the control plane element.

In certain aspects, the method further comprises: temporarily storing a plurality of usage reports at the user plane element, wherein the plurality of usage reports includes the first usage charging report, and wherein detecting the occurrence of an immediate reporting condition at the user plane element comprises: determining that the plurality of usage reports is equal to a first threshold. In certain examples, in response to determining that the plurality of usage reports is equal to the first threshold, the method further comprises: sending the plurality of usage reports, which include the first usage charging report, to the control plane element.

In certain aspects, the method further comprises: instantiating at least a second offline usage reporting rule at the user plane element, wherein the at least second offline usage reporting rule indicates at least a third trigger condition and indicates immediate charge reporting for the at least third trigger condition; detecting, at the user plane element, an occurrence of the at least third trigger condition in traffic processed by the user plane element; in response to the detecting of the occurrence the at least third trigger condition, generating at least a third usage report; and immediately sending at least the at least third usage report to the control plane element.

In certain aspects, the user plane element is a User Plane Function (UPF) of a 5G Core network, and wherein the control plane element is a Session Management Function (SMF) of the 5G Core network, and wherein sending the first usage report to the control plane element comprises: sending the first usage report from the User Plane Function to the Session Management Function via an N4 interface.

In certain aspects, the user plane element is a Packet Data Network Gateway User plane function (PGW-U) of a telecommunications network having a 4G Control and User Plane Separation of Evolved Packet Core (EPC) nodes (CUPS) based deployment, and wherein the control plane element is a Packet Data Network Gateway Control plane function (PGW-C), and wherein sending the at least first usage report to a control plane element comprises: sending the at least first usage report from the Packet Data Network Gateway User plane function to the Packet Data Network Gateway Control plane function via an SXb interface.

In another aspect, one or more non-transitory computer readable storage media encoded with instructions are provided. The instructions, when executed by a processor, cause the processor to: at a user plane element in a telecommunications network operating with separate control and data planes: instantiate at least one offline usage reporting rule, wherein the at least one offline usage reporting rule indicates one or more trigger conditions; detect, an occurrence of at least one of the one or more trigger conditions in traffic processed by the user plane element; in response to detecting of the occurrence of the at least one of the one or more trigger conditions, generate a first usage report; temporarily store the first usage report at the user plane element; detect an occurrence of an immediate reporting condition at the user plane element; and in response to detecting of the occurrence of the immediate reporting condition, send the first usage report to a control plane element.

In another aspect, an apparatus is provided. The apparatus comprises: one or more network interfaces configured for usage reporting in a telecommunications network operating with separate control and data plane; memory; and one or more processors configured to: instantiate at least one offline usage reporting rule at the apparatus, wherein the at least one offline usage reporting rule indicates one or more trigger conditions, detect an occurrence of at least one of the one or more trigger conditions in traffic processed by the apparatus; in response to the detecting of the occurrence of the at least one of the one or more trigger conditions, generate a first usage report; temporarily store the first usage report in the memory; detect an occurrence of an immediate reporting condition; and in response to detecting of the occurrence of the immediate reporting condition, send the first usage report to a control plane element.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for charge usage reporting in a telecommunications network operating with separate control and data planes, the method comprising:
    instantiating at least one offline usage reporting rule at a user plane element of the telecommunications network, wherein the at least one offline usage reporting rule indicates one or more trigger conditions;
    detecting, at the user plane element, an occurrence of at least one of the one or more trigger conditions in traffic processed by the user plane element;
    in response to the detecting of the occurrence of the at least one of the one or more trigger conditions, generating a first usage report;
    temporarily storing the first usage report at the user plane element;
    detecting an occurrence of an immediate reporting condition at the user plane element; and
    in response to detecting of the occurrence of the immediate reporting condition, sending the first usage report to a control plane element.

2. The method of claim 1, wherein instantiating the at least one offline usage reporting rule at the user plane element comprises:
    instantiating at least one offline usage reporting rule in which the at least one of the one or more trigger conditions is a time limit.

3. The method of claim 1, wherein instantiating the at least one offline usage reporting rule at the user plane element comprises:
    instantiating at least one offline usage reporting rule in which the at least one of the one or more trigger conditions is a volume limit.

4. The method of claim 1, further comprising:
    instantiating at least one online usage reporting rule at the user plane element, wherein the at least one online usage reporting rule indicates at least a second trigger condition, and
    wherein detecting the occurrence of an immediate reporting condition at the user plane element comprises:
    detecting an occurrence of the at least second trigger condition in traffic processed by the user plane element.

5. The method of claim 4, wherein in response to the detecting of the occurrence of the at least second trigger condition, the method further comprises:
    generating a second usage report; and
    sending at least the second usage report and the first usage report to the control plane element.

6. The method of claim 1, further comprising:
    temporarily storing a plurality of usage reports at the user plane element, wherein the plurality of usage reports includes the first usage report, and wherein detecting the occurrence of an immediate reporting condition at the user plane element comprises:
    determining that the plurality of usage reports is equal to a first threshold.

7. The method of claim 6, wherein in response to determining that the plurality of usage reports is equal to the first threshold, the method further comprises:
    sending the plurality of usage reports, which include the first usage report, to the control plane element.

8. The method of claim 1, further comprising:
    instantiating at least a second offline usage reporting rule at the user plane element, wherein the at least second offline usage reporting rule indicates at least a third trigger condition and indicates immediate charge reporting for the at least third trigger condition;
    detecting, at the user plane element, an occurrence of the at least third trigger condition in traffic processed by the user plane element;
    in response to the detecting of the occurrence the at least third trigger condition, generating at least a third usage report; and
    immediately sending at least the at least third usage report to the control plane element.

9. The method of claim 1, wherein the user plane element is a User Plane Function (UPF) of a 5G Core network, and wherein the control plane element is a Session Management Function (SMF) of the 5G Core network, and wherein sending the first usage report to the control plane element comprises:
    sending the first usage report from the User Plane Function to the Session Management Function via an N4 interface.

10. The method of claim 1, wherein the user plane element is a Packet Data Network Gateway User plane function (PGW-U) of a telecommunications network having a 4G Control and User Plane Separation of Evolved Packet Core (EPC) nodes (CUPS) based deployment, and wherein the control plane element is a Packet Data Network Gateway Control plane function (PGW-C), and wherein sending the at least first usage report to the control plane element comprises:
    sending the at least first usage report from the Packet Data Network Gateway User plane function to the Packet Data Network Gateway Control plane function via an SXb interface.

11. One or more non-transitory computer readable storage media encoded with instructions that, when executed by a processor, cause the processor to:
at a user plane element in a telecommunications network operating with separate control and data planes:
    instantiate at least one offline usage reporting rule, wherein the at least one offline usage reporting rule indicates one or more trigger conditions;
    detect, an occurrence of at least one of the one or more trigger conditions in traffic processed by the user plane element;
    in response to detecting of the occurrence of the at least one of the one or more trigger conditions, generate a first usage report;
    temporarily store the first usage report at the user plane element;
    detect an occurrence of an immediate reporting condition at the user plane element; and
    in response to detecting of the occurrence of the immediate reporting condition, send the first usage report to a control plane element.

12. The one or more non-transitory computer readable storage media of claim 11, wherein the instructions operable to instantiate the at least one offline usage reporting rule comprise instructions operable to:
   instantiate at least one offline usage reporting rule in which the at least one of the one or more trigger conditions is a time limit.

13. The one or more non-transitory computer readable storage media of claim 11, wherein the instructions operable to instantiate the at least one offline usage reporting rule comprise instructions operable to:
   instantiate at least one offline usage reporting rule in which the at least one of the one or more trigger conditions is a volume limit.

14. The one or more non-transitory computer readable storage media of claim 11, further comprising instructions operable to:
   instantiate at least one online usage reporting rule, wherein the at least one online usage reporting rule indicates at least a second trigger condition, and
wherein the instructions operable to detect the occurrence of an immediate reporting condition comprise instructions operable to:
   detect an occurrence of the at least second trigger condition in traffic processed by the user plane element.

15. The one or more non-transitory computer readable storage media of claim 14, further comprising instructions operable to, in response to the detecting of the occurrence of the at least second trigger condition:
   generate a second usage report; and
   send at least the second usage report and the first usage report to the control plane element.

16. The one or more non-transitory computer readable storage media of claim 11, further comprising instructions operable to:
   temporarily store a plurality of usage reports, wherein the plurality of usage reports includes the first usage report, and
wherein the instructions operable to detect the occurrence of an immediate reporting condition at comprise instructions operable to:
   determine that the plurality of usage reports is equal to a first threshold.

17. The one or more non-transitory computer readable storage media of claim 16, further comprising instructions operable to, in response to determining that the plurality of usage reports is equal to the first threshold:
   send the plurality of usage reports, which include the first usage report, to the control plane element.

18. The one or more non-transitory computer readable storage media of claim 11, further comprising instructions operable to:
   instantiate at least a second offline usage reporting rule, wherein the at least second offline usage reporting rule indicates at least a third trigger condition and indicates immediate charge reporting for the at least third trigger condition;
   detect an occurrence of the at least third trigger condition in traffic processed by the user plane element;
   in response to the detecting of the occurrence the at least third trigger condition, generate at least a third usage report; and
   immediately send at least the at least third usage report to the control plane element.

19. An apparatus comprising:
   one or more network interfaces configured for usage reporting in a telecommunications network operating with separate control and data plane;
   memory; and
   one or more processors configured to:
      instantiate at least one offline usage reporting rule at the apparatus, wherein the at least one offline usage reporting rule indicates one or more trigger conditions,
      detect an occurrence of at least one of the one or more trigger conditions in traffic processed by the apparatus;
      in response to the detecting of the occurrence of the at least one of the one or more trigger conditions, generate a first usage report;
      temporarily store the first usage report in the memory;
      detect an occurrence of an immediate reporting condition; and
      in response to detecting of the occurrence of the immediate reporting condition, send the first usage report to a control plane element.

20. The apparatus of claim 19, wherein to instantiate the at least one offline usage reporting rule, the one or more processors are configured to:
   instantiate at least one offline usage reporting rule in which the at least one of the one or more trigger conditions is one of a time limit or a volume limit.

* * * * *